United States Patent [19]

List

[11] 4,446,031

[45] May 1, 1984

[54] SEWAGE TREATMENT COMPOSITION ITS MANUFACTURE AND USE

[75] Inventor: David E. List, Derby, England

[73] Assignee: Tioxide Group Limited, Cleveland, England

[21] Appl. No.: 374,791

[22] Filed: May 4, 1982

[30] Foreign Application Priority Data

Jun. 30, 1981 [GB] United Kingdom ................ 8120175

[51] Int. Cl.$^3$ ........................... C09K 3/00; C09K 3/32
[52] U.S. Cl. ........................................ 252/1; 210/902; 210/916; 252/182; 252/186.1; 252/186.21
[58] Field of Search ........... 252/1, 182, 186.1, 186.21; 210/902, 916; 71/1; 423/395, 558

[56] References Cited

U.S. PATENT DOCUMENTS 4,108,771 8/1978 Weiss .................................... 210/50

FOREIGN PATENT DOCUMENTS 54-26966 2/1979 Japan .
1561024 2/1980 United Kingdom ................ 210/902

OTHER PUBLICATIONS

Remy, H., 1956 Treatise on Inorganic Chemistry, Elsevier Publishing Company, New York, pp. 277–279, 284–285.

*Primary Examiner*—Teddy S. Gron
*Assistant Examiner*—Howard J. Locker
*Attorney, Agent, or Firm*—Banner, Birch, McKie & Beckett

[57] ABSTRACT

In so-called rising main sewers in which sewage can be subjected to conditions when the supply of oxygen is deficient noxious sulphides can be produced which are a nuisance. The present invention provides a composition for the treatment of sewage so that the production of noxious sulphides is minimized under these conditions.

The composition of the invention comprises an aqueous solution of ferric sulphate and ferric nitrate in amounts such that the molecular ratio of ferric sulphate to ferric nitrate is from 1:0.5 to 1:3. Optionally the composition may contain nitric acid in an amount of up to 2.5 molecules per molecule of ferric sulphate.

These compositions are produced by reacting in aqueous solution nitric acid with ferrous sulphate in the absence of separately added sulphuric acid in such amounts that nitric acid is sufficient to produce the desired molecular ratio of ferric sulphate to ferric nitrate and the reaction is conducted at a temperature of at least 60° C. and not greater than 100° C.

4 Claims, No Drawings

SEWAGE TREATMENT COMPOSITION ITS MANUFACTURE AND USE

This invention relates to a treatment composition, its manufacture and use and is particularly concerned with compositions suitable for the treatment of sewage.

According to the present invention a composition for the treatment of sewage comprises an aqueous solution of ferric sulphate and ferric nitrate in amounts such that the molecular ratio of ferric sulphate to ferric nitrate is from 1:0.5 to 1:3 and, optionally, nitric acid in an amount of up to 2.5 molecules per molecule of ferric sulphate.

According to the invention also a process for the manufacture of a composition in accordance with the immediately preceding paragraph comprises reacting in aqueous solution nitric acid with ferrous sulphate (in the absence of separately added sulphuric acid), the amount of nitric acid being sufficient to produce ferric sulphate and ferric nitrate in solution and the reaction being conducted at a temperature of at least 60° C. and not greater than 100° C.

According to the invention also a process for the treatment of sewage comprises detecting an apparent or potential deficiency of free oxygen in a mass of sewage and adding to the sewage a composition in accordance with the invention whereby production of noxious sulphides is minimised.

The present invention provides a composition which is eminently suitable for use in the treatment of sewage. Bacteria in sewage under conditions when the supply of oxygen (air) is deficient tend to react with sulphate ions in solution and produce noxious sulphides such as hydrogen sulphide gas which can be a nuisance to persons in the vicinity. Such conditions can easily arise in so-called rising main sewers through which the sewage is pumped and in holding tanks or in other sewers such as gravity sewers, especially those in hot climates.

Addition of a composition in accordance with the present invention provides nitrates which the bacteria present in the sewage metabolise in preference to sulphates and the effluent of noxious sulphides is minimised.

The composition of the invention which is suitable for the treatment of sewage is an aqueous solution of ferric sulphate and ferric nitrate in a specified molecular ratio range. The molecular ratio of ferric sulphate to ferric nitrate is from 1:0.5 to 1:3 with a preferred composition including ferric sulphate and ferric nitrate in the molecular ratio within the range 1:0.75 to 1:1.25 and most preferred is a molecular ratio of about 1:1.

If desired the composition can contain free nitric acid which can result from an excess added at the commencement of manufacture of the composition or, alternatively, can be added after the preparation of the composition. The molecular ratio of ferric sulphate to ferric nitrate to nitric acid in the composition according to the invention can be from 1:0.5:0 to 1:3:2.5. In this specification the molecular ratios are to be determined using $Fe_2(SO_4)_3$, $Fe(NO_3)_3$ and $HNO_3$ as the formula for ferric sulphate, ferric nitrate and nitric acid respectively.

The composition of the present invention can be manufactured by mixing the ferric sulphate, ferric nitrate and, optionally, the free nitric acid in aqueous solution in the desired proportions but preferably the mixture of ferric sulphate and of ferric nitrate is formed in situ in aqueous solution by the oxidation of ferrous sulphate.

The source of ferrous sulphate can conveniently be copperas, i.e. $FeSO_4.7H_2O$ which is obtained as a by-product in the manufacture of titanium dioxide pigments by the so-called "sulphate" process. In this process a source of titanium dioxide (such as ilmenite or a slag) is digested with concentrated sulphuric acid and after dissolution of the cake produced, a solution of titanyl sulphate containing iron species is obtained. Subsequently the copperas (ferrous sulphate heptahydrate) is crystallised out and separated.

Copperas obtained from the sulphate process can have a small amount of sulphuric acid associated therewith and normally the amount of this acid is less than 2% by weight of the weight of copperas. Preferably the amount is as small as is conveniently possible to achieve but amounts less than 0.5% by weight e.g. about 0.2% by weight of acid by weight of copperas can be tolerated without difficulty in the process for the manufacture of the composition.

In accordance with the method of the invention the reaction with the nitric acid is conducted in the absence of added sulphuric acid. This is to be taken to mean that only sulphuric acid associated with the copperas is to be present and, as explained, this is to be present in only, at most, small amounts.

The oxidation reaction usually is carried out by adding solid finely divided copperas to aqueous nitric acid having a concentration of from 20% to 70% weight for weight in such an amount that ferric sulphate and ferric nitrate are produced. The reaction mixture is contained in any suitable vessel such as one formed from stainless steel and the effluent gas stream containing nitric oxide is stripped before discharge into atmosphere.

It is preferable that the copperas is added to the acid in a controlled manner and at such a rate that the effluent gas produced still contains oxygen to permit adequate stripping of the gas stream to take place prior to discharge to the atmosphere. The addition of copperas is conveniently made by means of a screw feeder so that a known rate of addition is achieved.

The reaction is conducted at a temperature not less than 60° C. to avoid the production in the solution of ferrous nitroso-sulphate. The temperature should not exceed 100° C., otherwise hydrolysis of the products can occur. Preferably the reaction is carried out within the temperature range 70° C. to 85° C. and most preferably at about 75° C.

The temperature is maintained by applying heat to the reaction vessel and the rate of addition of copperas is so chosen that the temperature does not fall below 60° C. at any time.

The reaction can be carried out continuously or batchwise (which generally is the easiest to control). In the batch process addition of copperas to acid continues until the desired amount has been added, depending on the amount of acid used. The reaction is complete when all the copperas has been added. At completion of the reaction it is usual to analyse the product to control the product composition and to permit any adjustment necessary to be made. For instance, the concentration of the ferric components in the aqueous solution can be adjusted by adding water or nitric acid can be added in amounts within the range specified previously herein.

Typically the composition provided for use will have a content of say from between 25 to 60% by total weight of feric sulphate and ferric nitrate and more particularly 30 to 45% by weight. The composition can be diluted prior to its use in treating sewage.

Treatment of sewage with the composition of the present invention is a valuable aid in keeping sewage "alive" and ensures that the bacteria remains active during the movement of the sewage to sewage treatment works and during storage in holding tanks when there can be a lack of available oxygen.

The invention is illustrated in the following Examples:

EXAMPLE 1

250 cm$^3$ of niric acid (60% weight for weight) and 400 cm$^3$ of water are placed in a glass beaker and the mixture was heated to 75° C. by means of a hot plate. The beaker was located in a fume cupboard during heating and subsequent reaction. Commercial copperas (ferrous sulphate heptahydrate) 675 grams was added in small portions while the acid was stirred with the addition of copperas being made over a period of 45 minutes and the temperature during the addition was maintained between 75° C. and 80° C.

On completion of the addition an aqueous solution of ferric sulphate and ferric nitrate was obtained. The solution contained ferric sulphate and ferric nitrate in a molecular ratio of 1:1.

The material so obtained was eminently suitable for the treatment of sewage.

EXAMPLE 2

The reaction carried out in Example 1 was repeated but using 156 cm$^3$ of the nitric acid and 475 cm$^3$ of water with the same amount of commercial copperas. The product obtained was an aqueous solution of ferric sulphate and ferric nitrate in the molecular ratio of 1:06. This product was eminently suitable for the treatment of sewage.

EXAMPLE 3

The experiment described in Example 1 was repeated but using 300 cm$^3$ of nitric acid having a strength of 60% weight for weight and 360 cm$^3$ of water. 675 grams of commercial copperas was used again. The product was a solution containing ferric sulphate and ferric nitrate and nitric acid in molecular proportions 1:1:0.75. This product was also eminently suitable for the treatment of sewage.

I claim:

1. A composition for the treatment of sewage comprising an aqueous solution of ferric sulphate and ferric nitrate in amounts such that the molecular ratio of ferric sulphate to ferric nitrate is from 1:0.75 to 1:1.25 and, optionally nitric acid in an amount of up to 2.5 molecules per molecule of ferric sulphate.

2. A composition according to claim 1 in which the molecular ratio of ferric sulphate to ferric nitrate is 1:1.

3. A composition according to claim 1 in which the total amount of ferric sulphate and ferric nitrate is from 25% to 60% by weight of the weight of the composition.

4. A composition according to claim 1 in which the total amount of ferric sulphate and ferric nitrate is from 30% to 45% by weight of the weight of the composition.

* * * * *